Patented Mar. 24, 1942

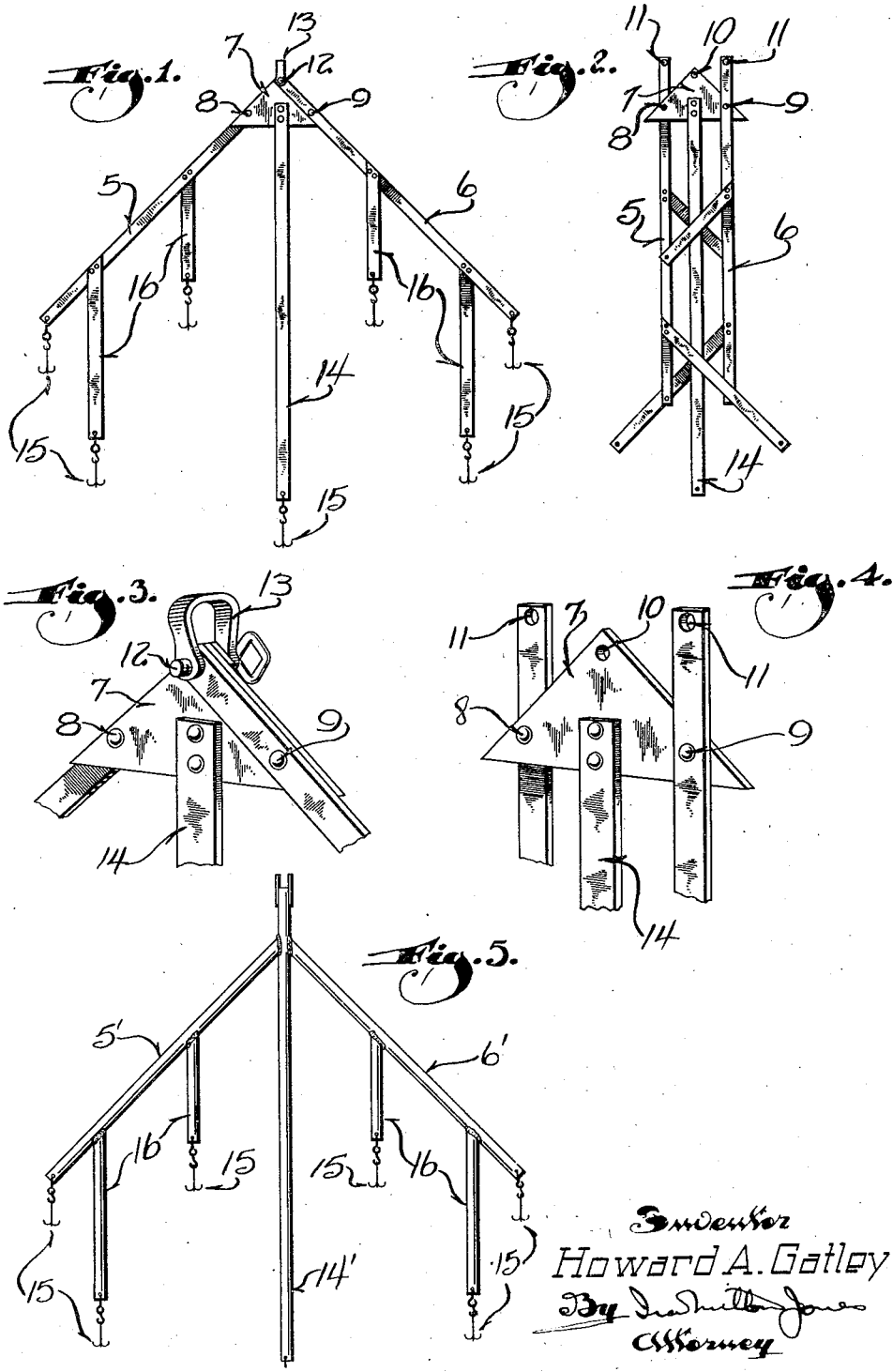

2,277,545

UNITED STATES PATENT OFFICE 2,277,545

BODY DRAG

Howard A. Gatley, Kenosha, Wis.

Application November 24, 1941, Serial No. 420,239

7 Claims. (Cl. 294—66)

This invention relates to drags or grapples for recovering bodies of drowned persons.

The conventional type of drag now in quite common use consists of a plurality of hooks suspending from a single crossbar. In use the crossbar is dragged along the bottom with the hooks trailing the bar. Inasmuch as the bar extends crosswise of its path of movement, it collects weeds and is often caught on projections and obstructions on the bottom of the lake or river being dragged; and as a consequence the grapple hooks lose effectiveness.

It is therefore an object of this invention to provide an improved drag which is so designed that weeds will not accumulate on the carrier structure to interfere with the effectiveness of the hooks.

Another objectionable feature of drags heretofore in use is their bulkiness which precluded carrying them as standard equipment in squad cars and the like.

This objection is overcome by the present invention through a novel manner of making the drag collapsible.

Another object of this invention is to so arrange the supports to which the grapple hooks are attached that although the hooks are free to swing as is customary and desirable, they cannot tangle with each other which was the case with the old conventional type of drag and which as a result often reduced the number of effective hooks by one-half.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawing illustrates two complete examples of the physical embodiment of the invention constructed in accordance with the best modes so far devised for the practical application of the principles thereof, and in which:

Figure 1 is a plan view of one form of drag constructed in accordance with this invention and showing the same set up for use;

Figure 2 is a plan view of the same drag collapsed for portability;

Figure 3 is an enlarged perspective view of the front end portion of the drag showing the manner in which it is releasably held in its operative position;

Figure 4 is a perspective view of the same portion of the drag but with the parts in the positions they occupy when the drag is collapsed; and Figure 5 is a top plan view of a noncollapsible drag embodying this invention.

Referring now particularly to the accompanying drawing, in which like numerals indicate like parts, the numerals 5 and 6 designate two similar side bars each of which is pivotally connected at one end to a triangular plate 7.

The pivots 8 and 9 by which the side bars are connected to the plate 7 are located adjacent to the lower corners of the triangular plate and at a distance from the ends of the side bars substantially equivalent to the distance intervening between the pivots and the apex of the triangular plate.

One of the side bars is at the undersurface of the plate and the other is on top of the plate. Hence, the extended short end portions of the bars may be swung to and from positions at which their ends are superimposed and in line with the apex of the triangular plate as shown in Figure 1.

The apex of the plate 7 has a hole 10 therethrough and the adjacent ends of the side bars have holes 11. All of the holes align when the side bars are swung to their extended positions shown in Figure 1 so that a pin or stud 12 may be passed therethrough to releasably secure the side bars at an angle to each other.

Preferably the pin or stud 12 also holds a clevis 13 assembled with the drag to facilitate the attachment of a line.

Secured to the triangular plate 7 is a center bar or support 14. The position of this center bar or support is such that it substantially bisects the angle defined by the side bars when the drag is in its position of use as shown in Figure 1, and when the drag is collapsed as shown in Figure 2 the side bars are substantially parallel with this center bar or support.

The extremity of the center bar or support has a grapple hook 15 connected thereto. Each of the side bars also has a hook support or supports 16 fixed thereto. In the present instance, each side bar has two such supports fixed thereto, and attached to the extremities of these supports are grapple hooks similar to the hook 15.

Grapple hooks are also preferably attached to the extremities of the side bars so that with the structure shown there will be seven grapple hooks.

Attention is directed to the fact that the length of the hook supports is staggered. That is, the adjacent hook supports are of different lengths and their extremities are spaced apart a distance greater than the combined lengths of the hooks attached thereto. Consequently, even though the hooks are free to swing, it is impossible for two adjacent hooks to become tangled and thus reduce the effectiveness of the drag. It is also to be seen that for a given span, the staggering of the hook supports as shown enables more hooks to be employed than was hitherto possible, with the result that the drag of this invention has an exceptional degree of efficiency.

The connections between the hook supports 16 and the side bars is rigid and holds the supports at such an angle to the side bars that when the side bars are in their extended positions as in Figure 1, all of the hook supports are substantially parallel with the center bar or support 14.

The length of the shorter inner hook supports is such that when the drag is collapsed as shown in Figure 2, they preferably do not extend beyond the opposite side bar. This precludes objectionable projections at the medial portion of the collapsed structure and facilitates handling.

Obviously, to set up the drag for use it is only necessary to swing the side bars out to their extended positions, engage the pin of the clevis through the aligned holes 10 and 11 and attach the grapple hooks.

While it is preferable to have the drag collapsible as described, the operative advantages of the drag are, of course, also obtainable with a rigid structure such as shown in Figure 5.

In this instance the side bars 5' and 6' are preferably tubular and are welded or otherwise secured to the center bar or support 14' which is also tubular.

The hook supports 16' are secured to the side bars in the same manner, that is, welded, and as before, the ends of these supports terminate at different distances from the side bars so that the hooks carried thereby cannot swing into engagement with each other.

In operation it has been found that the drag of this invention does not pick up weeds and other obstructions except by means of its hooks. This follows from the fact that the side bars are set at an angle to each other so that they readily slide across or "plow" between weeds and similar obstructions.

From the foregoing description, taken in connection with the accompanying drawing, it will be readily apparent that this invention provides a substantial advantage over past conventional drags where, as noted hereinbefore, the crossbar is subject to becoming lodged behind obstructions and otherwise picks up weeds to such an extent as to render the hooks totally ineffective.

What I claim as my invention is:

1. A drag of the character described comprising: two bars connected together in angular relationship; a plurality of grapple hook supports extending from the bars and disposed in the angle defined between the bars, said grapple hook supports lying in substantially the same plane as the bars, and adjacent supports being of substantially different lengths; and grapple hooks attached to said supports.

2. A drag of the character described comprising: two rigid side bars connected together at one end to define an angle therebetween; a plurality of rigid hook supports extended from said side bars, one of said supports substantially bisecting the angle between said side bars and the other hook supports being parallel with said bisecting support; and grapple hooks on the ends of said supports, the ends of adjacent hook supports being spaced apart a distance greater than the combined length of the hooks attached thereto so that the hooks cannot tangle with each other although they are free to swing.

3. A drag of the character described comprising: a pair of side bars; a plate to which the adjacent ends of both side bars are pivotally connected, said pivotal connection between the side bars and the plate enabling the bars to be swung from positions substantially parallel with each other to positions at an angle to each other; means additional to the pivotal connections between the side bars and the plate for securing the side bars to the plate to hold the bars in angular relationship; hook supports attached to said side bars, said hook supports being substantially parallel with each other when the side bars are secured in angular relationship; and grapple hooks on the ends of said supports.

4. A drag of the character described comprising: a center support; a pair of side bars; means pivotally connecting one end of each side bar with one end of the center support so that said side bars are movable from positions alongside the center support to extended positions at an angle thereto; means for releasably holding the side bars in said extended positions; additional supports attached to said side bars, the attachment of said additional supports to the side bars being rigid and holding the supports in positions at which they are substantially parallel to the center support when the side bars are extended; grapple hooks on the free ends of all of said supports, and the lengths of all of said supports being such that their free ends are spaced apart sufficiently to preclude the grapple hooks on adjacent supports tangling with each.

5. A drag of the character described comprising: a center support; a plate fixed to one end of the center support; side bars each pivotally connected to said plate so as to enable the side bars to be swung from positions alongside the center support to extended positions at an angle thereto, the pivoted ends of the side bars having openings adapted to align with an opening through the plate when said side bars are extended so that a pin inserted into the aligned openings releasably secures the side bars in their extended positions; other supports attached to the side bars; and grapple hooks on the free ends of the supports.

6. A drag of the character described comprising: a center bar; a plate fixed to one end of the center bar; a pair of side bars each pivotally connected to the plate with one of the side bars on one side of the plate and the other on the opposite side of the plate, said plate having a hole substantially equispaced from the pivots of the side bars and the side bars having holes adapted to align with said hole in the plate when the side bars are moved from positions alongside the center bar to extended positions at an angle to the center bar; a clevis having a pin passed through the aligned holes in the plate and side bars to releasably secure the side bars in angular relationship; hook supports fixed to the side bars in position to be substantially parallel with the center bar when the side bars are in their extended angular positions; and grapple hooks on the extremities of said supports and the center bar.

7. A drag of the character described comprising: two rigid side bars; means connecting said rigid side bars at one end; means at said end to which a drag line may be attached so that said end of the side bars constitutes the leading end of the drag; and a plurality of grapple hook supports rigidly fixed to each of said side bars and extending rearwardly toward the trailing end of the drag, adjacent hook supports of each side bar being of different lengths so that grapple hooks attached to the trailing ends of said supports will be held clear of each other when the drag is in use.

HOWARD A. GATLEY.